B. F. PENNEY.
Shingle Sawing-Machine.
No. 216,344.  Patented June 10, 1879.
Fig. 1.
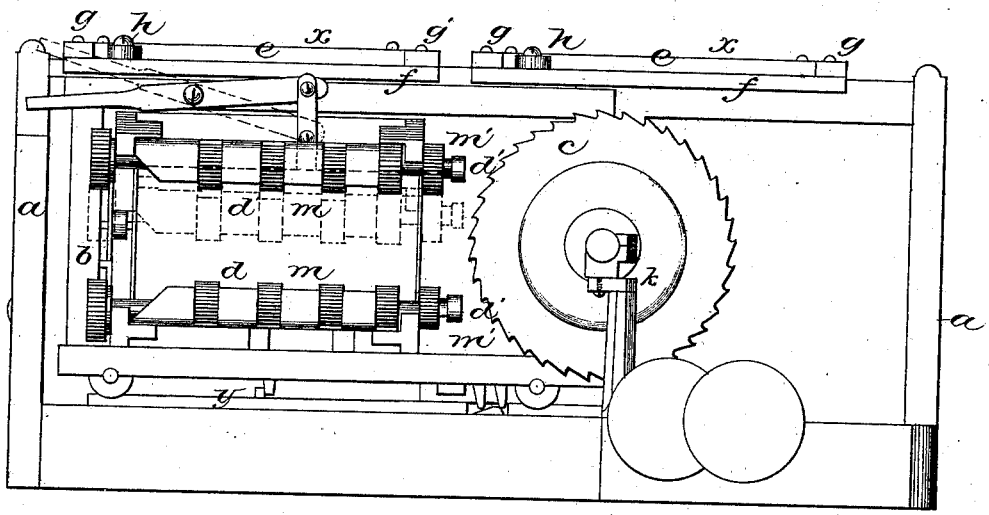
Fig. 2.
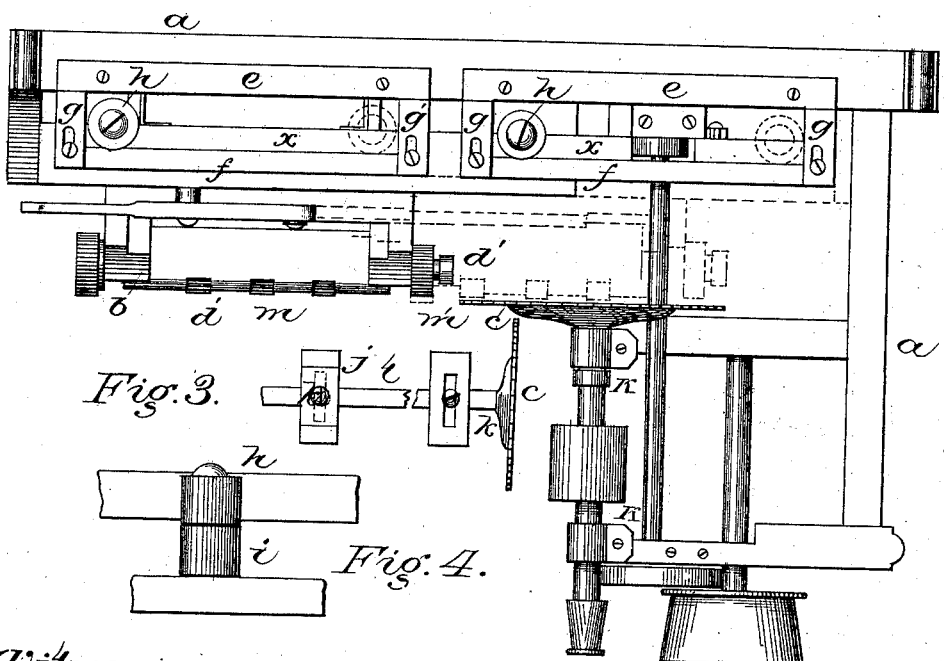
Fig. 3.
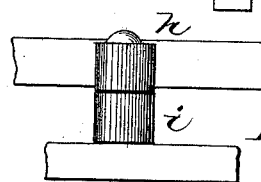
Fig. 4.
Witnesses:
Wm Franklin Seavey
John R. Mason
Inventor:
Benjamin F. Penney

UNITED STATES PATENT OFFICE.

BENJAMIN F. PENNEY, OF DEDHAM, ASSIGNOR OF ONE-HALF HIS RIGHT TO THE HINCKLEY & EGERY IRON COMPANY, OF BANGOR, MAINE.

IMPROVEMENT IN SHINGLE-SAWING MACHINES.

Specification forming part of Letters Patent No. 216,344, dated June 10, 1879; application filed December 13, 1878.

*To all whom it may concern:*

Be it known that I, BENJAMIN F. PENNEY, of Dedham, in the county of Hancock and State of Maine, have invented certain new and useful Improvements in Shingle-Sawing Machines; and I do hereby declare that the following is a full, clear, and exact description of the invention, that will enable others skilled in the art to which it appertains to make and use the same, reference being had to the accompanying drawings, forming a part of this specification, in which—

Figure 1 shows a front elevation; Fig. 2, details of upper guide; Fig. 3, details of journal-box connection; Fig. 4, detail showing rolls $h\ i$.

Same letters show like parts.

My invention relates to certain improvements in shingle-machines, particularly that kind having a carriage moving in a horizontal plane. They will be best understood by reference to the accompanying drawings.

At $a$ is shown the frame of the machine, supporting the vertical carriage $b$, and provided with tracks or ways $x\ y$, extending past the center of the saw $c$ sufficiently far to permit the carriage and the set-works thereon to pass by said center when moved toward the saw for a portion of the length of the set-works—about six or eight inches in a working machine. This enables larger shingles to be cut (the size of saw being equal to that on the ordinary machine) or a smaller saw to be used, the effect being to permit a saw to be used for a much longer time before being thrown aside.

The surface of the saw nearest the carriage is flush, the saw-collar being on the opposite side, thus presenting no obstacle to the passage of the shingle-bolt, which is so held and fed by the carriage that a horizontal line passing through the saw-center will pass through the body of the bolt. This enables the saw to cut a bolt exceeding in width or length, or both, the radius of the saw.

An improvement in the set-works contributes to this result. The jaws $m$ are unobstructed at the end $m'$ toward the saw $c$, and the set-rolls $d$ project, as at $d'$, beyond the jaws, allowing the bolt to project, while at the same time it is firmly held. This economizes travel of the carriage, as the bolt $r$ may be set at the start close to the edge of the saw, projecting beyond the jaws, and is thus enabled to follow the edge of the saw as it is worn smaller by use.

The lower side of the carriage runs on a track, $y$, upon the frame $a$, as common; but the track $x$, guiding the upper side, is constructed as follows: It consists of guides $e\ f$, the guide $e$ being attached to the frame, and the guide $f$ to arms $g$, projecting therefrom and containing stop $g'$, permitting an adjustment toward or from the guide $e$. The guide $f$ is parallel to, but below, the guide $e$. Upon the carriage are rollers $h\ i$, one above the other, the upper roller, $h$, bearing against the guide $e$, and the lower, $i$, against the guide $f$. As the guides or rollers wear away, the guide $f$ is moved toward the frame, keeping the rollers $h\ i$ always in contact with the proper guide, and preventing backlash without the necessity of sending the machine to the shop for repairs.

As the machine wears by use the saw-arbor frequently gets out of line with the line of movement of the carriage, rendering it necessary to remove it and rebabbitt the journal-boxes. To obviate this, I set each box $j\ j$ upon slotted arms $k\ k$, securing them by proper bolts and nuts $n$.

When the saw is to be "lined" it is only necessary to start these bolts, swing the arbor $t$ together with the boxes until the saw is in proper position, and tighten the nuts again. The remaining parts of my machine are of the ordinary construction.

What I claim as my invention is—

1. In a shingle-machine, the combination of a carriage, $b$, moving in a horizontal plane, with tracks $x\ y$, guiding said carriage past the saw-center, and a saw, $c$, flush upon the side next the bolt, and so arranged with reference to the carriage that a horizontal line drawn through the saw-center shall pass through the body of the bolt, substantially as and for the purposes set forth.

2. In a shingle-machine, the set-rolls $d$, projecting at $d'$, and adapted to grasp the bolt beyond the set-work jaws, as and for the purposes described.

3. The combination of the carriage $b$, extended tracks $x$ $y$, and saw $c$, arranged as herein set forth, with set-works provided with set-rolls $d$, extending past the set-work jaws $m$, as described.

4. The carriage $b$, provided with rollers $h$ $i$, in combination with a guide and adjustable guide $f$, substantially as and for the purposes set forth.

5. The saw-arbor $t$, in combination with adjustable journal-boxes $j$ $j$, pivoted by bolts and nuts $n$ upon slotted arms $k$ $k$, all operating as and for the purposes set forth.

In testimony that I claim the foregoing I have hereunto set my hand this 7th day of December, 1878.

BENJAMIN F. PENNEY.

Witnesses:
WM. FRANKLIN SEAVEY,
JOHN R. MASON.